(12) United States Patent
Takatani et al.

(10) Patent No.: US 7,154,743 B2
(45) Date of Patent: Dec. 26, 2006

(54) SOLID ELECTROLYTIC CAPACITOR AND METHOD FOR MANUFACTURING SAME

(75) Inventors: Kazuhiro Takatani, Takatsuki (JP); Mutsumi Yano, Hirakata (JP); Mamoru Kimoto, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/537,813

(22) PCT Filed: Dec. 3, 2003

(86) PCT No.: PCT/JP03/15501

§ 371 (c)(1), (2), (4) Date: Jun. 7, 2005

(87) PCT Pub. No.: WO2004/055843

PCT Pub. Date: Jul. 1, 2004

(65) Prior Publication Data

US 2006/0114645 A1    Jun. 1, 2006

(30) Foreign Application Priority Data

Dec. 13, 2002  (JP) .............................. 2002-361642
Mar. 7, 2003   (JP) .............................. 2003-062000

(51) Int. Cl.
*H01G 9/04*   (2006.01)
*H01G 9/145*  (2006.01)

(52) U.S. Cl. ...................................... 361/532; 361/528
(58) Field of Classification Search ........ 361/523–524, 361/528–529, 532, 533–541
See application file for complete search history.

(56) References Cited

U.S. PATENT DOCUMENTS 6,381,121 B1 *  4/2002  Monden et al. ............. 361/525
6,783,703 B1 *  8/2004  Ohata et al. ................ 252/511

FOREIGN PATENT DOCUMENTS

| JP | 57-83022    | 5/1982 |
| JP | 57-83022 A  | 5/1982 |
| JP | 58-161315   | 9/1983 |
| JP | 58-161315 A | 9/1983 |
| JP | 2-56915     | 2/1990 |
| JP | 10-242000   | 9/1998 |

* cited by examiner

*Primary Examiner*—Eric W. Thomas
(74) *Attorney, Agent, or Firm*—Westerman, Hattori, Daniels & Adrian, LLP.

(57) ABSTRACT

A solid electrolytic capacitor comprises an anode formed of at least one metal selected from tantalum, niobium, titanium and tungsten, and a dielectric layer, an electrolytic layer and a cathode disposed on the anode, wherein the cathode comprises a mixed layer containing a first material consisting of silver particles having an average particle diameter (median diameter) of not less than 2 μm, a second material consisting of conducting carbon particles and/or silver particles having an average particle diameter (median diameter) of 1 μm or less and a binding agent.

20 Claims, 4 Drawing Sheets

SOLID ELECTROLYTIC CAPACITOR AND METHOD FOR MANUFACTURING SAME

TECHNICAL FIELD

The present invention relates to a solid electrolytic capacitor and a fabrication method therefor. More particularly, the invention relates to a solid electrolytic capacitor comprising an anode formed of at least one metal selected from tantalum, niobium, titanium and tungsten, a dielectric layer formed on the anode, and an electrolytic layer and a cathode disposed on the dielectric layer, characterized in that the cathode is improved and an equivalent series resistance (ESR) in high frequency regions is decreased.

BACKGROUND ART

Solid electrolytic capacitors are conventionally used for personal computers and so on.

Recently, an instant supply of current to a circuit has been required because of increase in frequency of CPUs for use in personal computers. Therefore, development of a solid electrolytic capacitor featuring a decreased equivalent series resistance in high frequency regions has been demanded.

As such solid electrolytic capacitors, solid electrolytic capacitors including an anode formed of a metal, such as tantalum and so on, a dielectric layer of an oxide of such a metal formed on the anode, and an electrolytic layer and a cathode deposited on the dielectric layer are generally used.

As the cathode of such solid electrolytic capacitors, two layers of a carbon layer and a silver layer deposited on the electrolytic layer are generally used.

However, the cathode of the two layers of the carbon layer and the silver layer has a problem as follows. Because a contact resistance between the carbon layer and the silver layer is increased due to differences in properties between the carbon layer and the silver layer, the equivalent series resistance in the high frequency regions is increased.

Therefore, for example, JP-A-10-242000 discloses a solid electrolytic capacitor including the cathode comprising three layers of a carbon layer, a mixed layer of carbon and silver and a silver layer formed on an electrolytic layer for the purpose of decreasing the equivalent series resistance in the high frequency regions.

However, according to results of examinations made by inventors of the present invention, in the case of forming the three layers of the carbon layer, the mixed layer of carbon and silver, and the silver layer as the cathode on the electrolytic layer as mentioned above, the contact resistance between the mixed layer of carbon and silver and the silver layer was increased and it was still impossible to sufficiently decrease the equivalent series resistance in the high frequency regions.

DISCLOSURE OF THE INVENTION

The present invention is made in order to solve the aforementioned problems. Also, it is an object of the invention to decrease a contact resistance and so on to obtain a solid electrolytic capacitor with a decreased equivalent series resistance in high frequency regions.

According to the invention, a solid electrolytic capacitor comprises an anode formed of at least one metal selected from tantalum, niobium, titanium and tungsten and a dielectric layer, an electrolytic layer and a cathode disposed on the anode, wherein the cathode comprises a mixed layer containing a first material consisting of silver particles having an average particle diameter (median diameter) of not less than 2 μm, a second material consisting of conducting carbon particles and/or silver particles having an average particle diameter (median diameter) of 1 μm or less and a binding agent.

As the aforementioned solid electrolytic capacitor, in a case where the mixed layer containing the first material consisting of the silver particles having the median diameter of not less than 2 μm, the second material consisting of the conducting carbon particles and/or the silver particles having the median diameter of 1 μm or less and the biding agent is formed as the cathode on the electrolytic layer, the particles of the second material consisting of the conducting carbon particles and/or the silver particles having the median diameter of 1 μm or less enter spaces between the particles of the first material consisting of the silver particles having the median diameter of not less than 2 μm, so that conductivity in the mixed layer is improved and adhering property between the mixed layer and the electrolytic layer is enhanced decreasing the contact resistance thereof. As a result, the equivalent series resistance in the high frequency regions is notably decreased.

In the solid electrolytic capacitor, as the cathode, a carbon layer may be formed in addition to the mixed layer. Such a carbon layer is formed between the electrolytic layer and the mixed layer.

In a case where the carbon layer is formed on the electrolytic layer as mentioned above and the mixed layer containing the first material consisting of the silver particles having the median diameter of not less than 2 μm, the second material consisting of the conducting carbon particles and/or the silver particles having the median diameter of 1 μm or less and the biding agent is formed on the carbon layer, the particles of the second material consisting of the conducting carbon particles and/or the silver particles having the median diameter of 1 μm or less enter the spaces between the particles of the first material consisting of the silver particles having the median diameter of not less than 2 μm in the mixed layer, so that the conductivity in the mixed layer is improved and the adhering property between the mixed layer and the carbon layer is enhanced decreasing the contact resistance. As a result, the equivalent series resistance in high frequency regions is notably decreased.

Further, in the mixed layer of the solid electrolytic capacitor, when an amount of the second material consisting of the conducting carbon particles and/or the silver particles having the median diameter of 1 μm or less is insufficient, the particles of the second material consisting of the conducting carbon particles and/or the silver particles having the median diameter of 1 μm or less do not sufficiently enter the spaces between the particles of the first material consisting of the silver particles having the median diameter of not less than 2 μm, so that it becomes difficult to obtain the above mentioned results. On the other hand, when the amount of the second material is excessive, the amount of the first material having a larger particle diameter becomes insufficient. As a result, electricity moves passing through a lot of contact areas, and the contact resistance between particles is increased causing increase in the equivalent series resistance. In view of the above, the amount of the second material based on a total amount of the first material and the second material is preferably set in a range of 0.5 to 40 wt %, and more preferably in a range of 3 to 40 wt %.

In the solid electrolytic capacitor, it is difficult to obtain the silver particles having the median diameter of 1 μm or less to be used in the mixed layer by grinding. Therefore, it is preferable to reduce silver oxide particles having the median diameter of 1 µm or less to obtain silver particles having the median diameter of 1 µm or less.

In order to obtain the mixed layer containing the silver particles having the median diameter of 1 µm or less, the silver oxide particles having the median diameter of 1 µm or less are contained in the mixed layer and then the silver oxide particles are reduced.

In a case where the silver oxide particles having the median diameter of 1 µm or less are contained in the mixed layer and reduced, as a method of reduction, for example, heat-treatment at not less than 160° C. is preferable.

Further, in the solid electrolytic capacitor, when the contact area between the silver particles of the first material and the silver particles of the second material is enlarged, the conductivity in the mixed layer is enhanced and the equivalent series resistance is decreased. In order to obtain such a result, it is preferable to use scale-shaped silver particles of which ratio of a thickness to a length is very small as the silver particles of the first material and/or the second material.

Usable scale-shaped silver particles as the first material are the scale-shaped silver particles having a median in a maximum length of not less than 2 µm and the usable scale-shaped silver particles as the second material are the scale-shaped silver particles having the median in the maximum length of 1 µm or less. The maximum length in the silver particles is a length of a line drawn maximumly between two points on the periphery of the particles. The median in the maximum length is a length of a cumulated point on the cumulated distribution curve of the maximum length of these particles becoming 50%.

When a ratio of the maximum length L to thickness d (L/d) in each of the scale-shaped silver particles is too small, it becomes difficult to further decrease the equivalent series resistance by enlargement of the contact areas between the silver particles of the first material and silver particles of the second material. On the other hand, when the aforementioned ratio (L/d) is too large, an amount of the binding agent covering surfaces of the silver particles becomes excessive, so that the equivalent series resistance is increased. In view of the above, it is preferable to use scale-shaped silver particles having the ratio of the maximum length L to the thickness d (L/d) set in a range of 4 to 100.

As the same as the aforementioned solid electrolytic capacitor, in both cases where the scale-shaped silver particles having the median in the maximum length of not less than 2 µm are used as the first material and the scale-shaped silver particles having the median in the maximum length of 1 µm or less are used as the second material, when the amount of the second material in the mixed layer is insufficient, the particles of the second material do not sufficiently enter the spaces between the particles of the first material, so that the aforementioned results can not be obtained. On the other hand, when the amount of the second material is excessive, the amount of the first material becomes insufficient and electricity moves passing through a lot of contact areas, resulting in increase in the contact resistance and the equivalent series resistance in high frequency regions. In view of the above, the amount of the second material based on the total amount of the first material and the second material is preferably set in a range of 0.5 to 40 wt %, more preferably in a range of 3 to 40 wt %.

Further, as the same as the silver particles having the median diameter of 1 µm or less, it is difficult to obtain the scale-shaped silver particles having the median in the maximum length of 1 µm or less by grinding. Therefore, it is preferable to reduce the scale-shaped silver oxide particles having the median in the maximum length of 1 µm or less to obtain the scale-shaped silver particles having the median in the maximum length of 1 µm or less.

Further, in order to obtain the mixed layer containing the scale-shaped silver particles having the median in the maximum length of 1 µm or less, the silver oxide particles having the median in the maximum length of 1 µm or less are contained in the mixed layer and then the silver oxide particles are reduced.

In a case where the scale-shaped silver oxide particles having the median in the maximum length of 1 µm or less are contained in the mixed layer and reduced, as the method for the reduction, for example, the heat-treatment at not less than 160° C. is preferable.

As the conducting carbon particles in the second material, for example, carbon black or graphite can be used. In particular, it is preferable to use a mixture of carbon black and graphite.

As the binding agent for the mixed layer, it is possible to use well-known binding agents which have been conventionally used. In particular, it is preferable to use at least one resin selected from polyimide resin, epoxy resin and polyester resin. In the case of using at least one resin selected from polyimide resin, epoxy resin and polyester resin as the binding agent, the adhesive characteristics between the carbon layer and the mixed layer is further enhanced and the equivalent series resistance in the high frequency regions is further decreased in a first solid electrolytic capacitor wherein the carbon layer is formed, and the adhesive characteristics between the electrolytic layer and the mixed layer is further enhanced and the equivalent series resistance in high frequency regions is further decreased in a second solid electrolytic capacitor wherein the carbon layer is not formed.

BEST MODES FOR CARRYING OUT THE INVENTION

A solid electrolytic capacitor according to Embodiments of the invention will be described hereinbelow in details with reference to the accompanying drawings.

(Embodiment 1)

Figure 1:
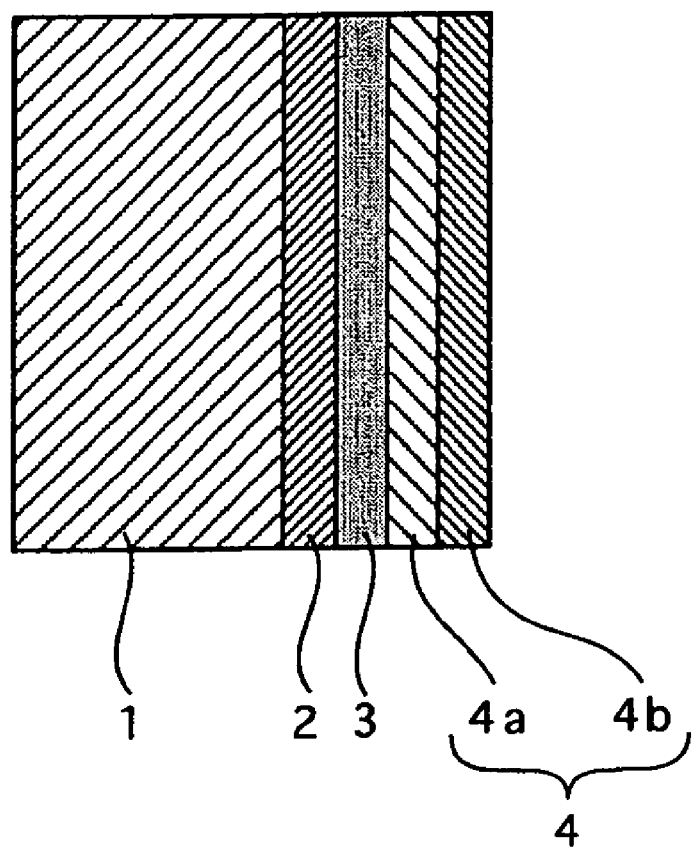
FIG. 1 is a sectional view illustrating a solid electrolytic capacitor according to Embodiment 1 of the invention.

As shown in FIG. 1, a solid electrolytic capacitor according to Embodiment 1 has the following structure. An anode 1 formed of at least one metal selected from tantalum, niobium, titanium and tungsten is anodized to form a dielectric layer 2 of an oxide on a surface thereof, an electrolytic layer 3 comprising such as conducting polymer and manganese dioxide is formed on the dielectric layer 2, and a cathode 4 is formed on the electrolytic layer 3.

In the solid electrolytic capacitor of Embodiment 1, a carbon layer 4a is formed as the cathode 4 on the electrolytic layer 3 and a mixed layer 4b containing a first material consisting of silver particles having a median diameter of not less than 2 µm, a second material consisting of conducting carbon particles and/or silver particles having a median diameter of 1 μm or less and a binding agent is formed on the carbon layer 4a.

It is possible to use scale-shaped silver particles having the median in the maximum length of not less than 2 μm as the first material instead of the silver particles having the median diameter of not less than 2 μm. Also, it is possible to use scale-shaped silver particles having the median in the maximum length of 1 μm or less as the second material instead of the silver particles having the median diameter of 1 μm or less.

(Embodiment 2)

Figure 2:
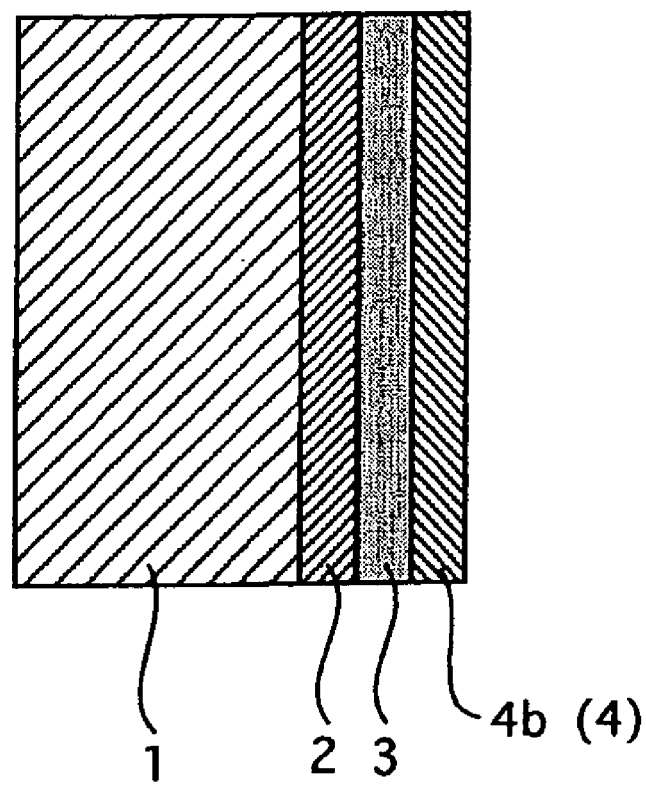
FIG. 2 is a sectional view illustrating a solid electrolytic capacitor according to Embodiment 2 of the invention.

As shown in FIG. 2, a solid electrolytic capacitor according to Embodiment 2 has the following structure. An anode 1 formed of at least one metal selected from tantalum, niobium, titanium and tungsten is anodized to form a dielectric layer 2 of an oxide on the surface thereof, an electrolytic layer 3 formed of such as conducting polymer and manganese dioxide is formed on the dielectric layer 2, and a cathode 4 is formed on the electrolytic layer 3.

In the solid electrolytic capacitor of the Embodiment 2, the carbon layer 4a is not formed as the cathode 4 on the electrolytic layer 3, only the mixed layer 4b containing the first material consisting of the silver particles having the median diameter of not less than 2 μm, the second material consisting of the conducting carbon particles and/or the silver particles having the median diameter of 1 μm or less and the binding agent is formed.

In the solid electrolytic capacitor of Embodiment 2, it is possible to use scale-shaped silver particles having a median in a maximum length of not less than 2 μm as the first material instead of the silver particles having the median diameter of not less than 2 μm. Also, it is possible to use the scale-shaped silver particles having the median in the maximum length of 1 μm or less as the second material instead of the silver particles having the median diameter of 1 μm or less.

EXAMPLES

Hereinafter, a solid electrolytic capacitor according to examples of the invention will specifically be described while comparative examples will be cited to demonstrate that equivalent series resistance in high frequency regions in the inventive solid electrolytic capacitor of examples is notably decreased. It is to be noted that the solid electrolytic capacitor of the invention should not be limited to the following examples thereof and suitable changes and modifications may be made thereto within the scope of the invention.

Example A1

A solid electrolytic capacitor of Example A1 has the same structure of the solid electrolytic capacitor of Embodiment 1 as described above.

In the solid electrolytic capacitor according to Example A1, an anode formed of tantalum sintered body was anodized to form a dielectric layer 2 of an oxide film on a surface thereof, an electrolytic layer 3 consisting of polypyrrole of a conducting polymer obtained by electrolytic polymerization and so on was formed on the dielectric layer 2, and a cathode 4 was formed on the electrolytic layer 3.

In forming the cathode 4 on the electrolytic layer 3, a carbon paste prepared by mixing graphite (5 wt %), water (90 wt %) and carboxymethyl cellulose as a binding agent (5 wt %) was coated on the electrolytic layer 3 and dried at a temperature of 150° C. for 30 minutes to form a carbon layer 4a on the electrolytic layer 3.

On the other hand, a paste for the mixed layer was prepared by admixing 88 parts by weight of a mixture wherein silver particles of nearly spherical form having a median diameter of 3 μm and silver oxide (I) $Ag_2O$ particles of nearly spherical form having a median diameter of 0.5 μm were mixed in a weight ratio of 95:5 with 5 parts by weight of polyamideimide which is one of polyimide resin as the binding agent and 7 parts by weight of γ-butyrolactone as a solvent.

Next, the paste for the mixed layer was coated on the carbon layer 4a and dried at 160° C. for 30 minutes reducing the silver oxide (I) $Ag_2O$ particles to form a mixed layer 4b containing the silver particles having the median diameter of 3 μm and the silver particles having the median diameter of 0.5 μm bound by polyamideimide.

Example A2

In a solid electrolytic capacitor of Example A2, silver oxide (II) AgO particles of nearly spherical form having a median diameter of 0.5 μm was used instead of the silver oxide (I) $Ag_2O$ particles of nearly spherical form having the median diameter of 0.5 μm for preparing the paste for the mixed layer of the solid electrolytic capacitor of Example A1. Except for the above, the same procedure as in Example 1 was used to form the mixed layer 4b containing the silver particles having the median diameter of 3 μm and the silver particles having the median diameter of 0.5 μm bound by polyamideimide.

Example A3

In a solid electrolytic capacitor of Example A3, acetylene black which is one of carbon black having a median diameter of 0.05 μm was used instead of the $Ag_2O$ particles having the median diameter of 0.5 μm for preparing the paste for the mixed layer of the solid electrolytic capacitor of Example A1. Except for the above, the same procedure as in Example A1 was used to form the mixed layer 4b containing the silver particles having the median diameter of 3 μm and acetylene black having the median diameter of 0.05 μm bound by polyamideimide.

Example A4

In a solid electrolytic capacitor of Example A4, a mixture wherein the silver particles of nearly spherical form having the median diameter of 3 μm, the $Ag_2O$ particles of nearly spherical form having the median diameter of 0.5 μm and acetylene black having the median diameter of 0.05 μm were mixed in a weight ratio of 95:2.5:2.5 was used for preparing the paste for the mixed layer of the solid electrolytic capacitor of Example A1. Except for the above, the same procedure as in Example A1 was used to form the mixed layer 4b containing the silver particles having the median diameter of 3 μm, the silver particles having the median diameter of 0.5 μm and acetylene black having the median diameter of 0.05 μm bound by polyamideimide.

Example B1

A solid electrolytic capacitor of Example B1 has the same structure of the solid electrolytic capacitor of Embodiment 2 as described above.

In a solid electrolytic capacitor of Example B1, in forming the cathode 4 of the solid electrolytic capacitor of Example A1, the carbon layer 4a was not formed on the electrolytic layer 3 consisting of polypyrrole. Except for the above, the same procedure as in Example A1 was used to form the cathode 4 consisting of the mixed layer 4b containing the silver particles having the median diameter of 3 μm and the silver particles having the median diameter of 0.5 μm bound by polyamideimide on the electrolytic layer 3.

Comparative Example 1

Figure 3:
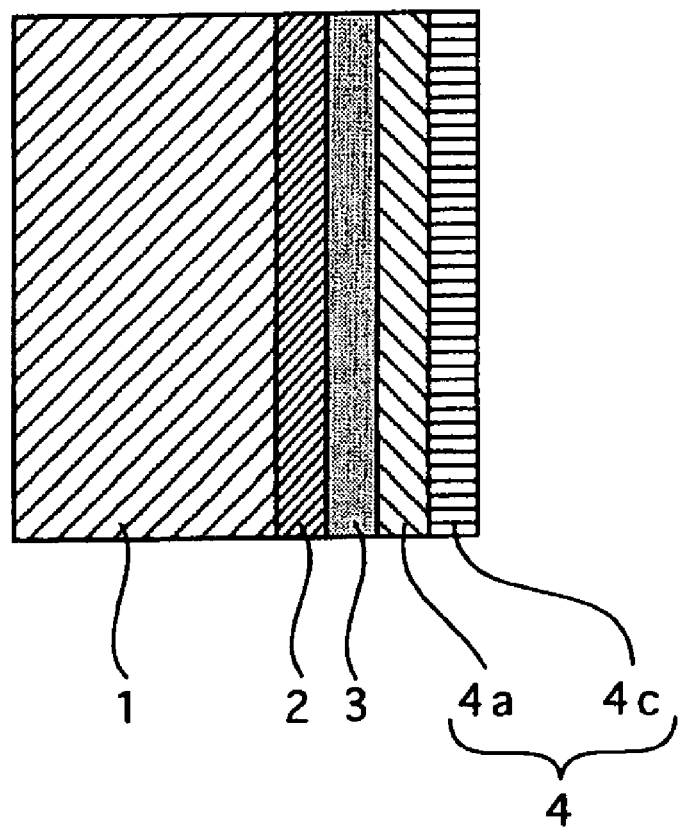
FIG. 3 is a sectional view illustrating a solid electrolytic capacitor fabricated in Comparative Example 1.

In a solid electrolytic capacitor of Comparative Example 1, a silver paste prepared by admixing 88 parts by weight of the silver particles of nearly spherical form having the median diameter of 3 μm with 5 parts by weight of polyamideimide and 7 parts by weight of γ-butyrolactone as the solvent was used instead of the paste for the mixed layer used in the solid electrolytic capacitor of Example A1. Except for the above, the same procedure as in Example A1 was used to form a silver layer 4c wherein the silver particles having the median diameter of 3 μm were bound by polyamideimide as shown in FIG. 3.

Comparative Example 2

Figure 4:
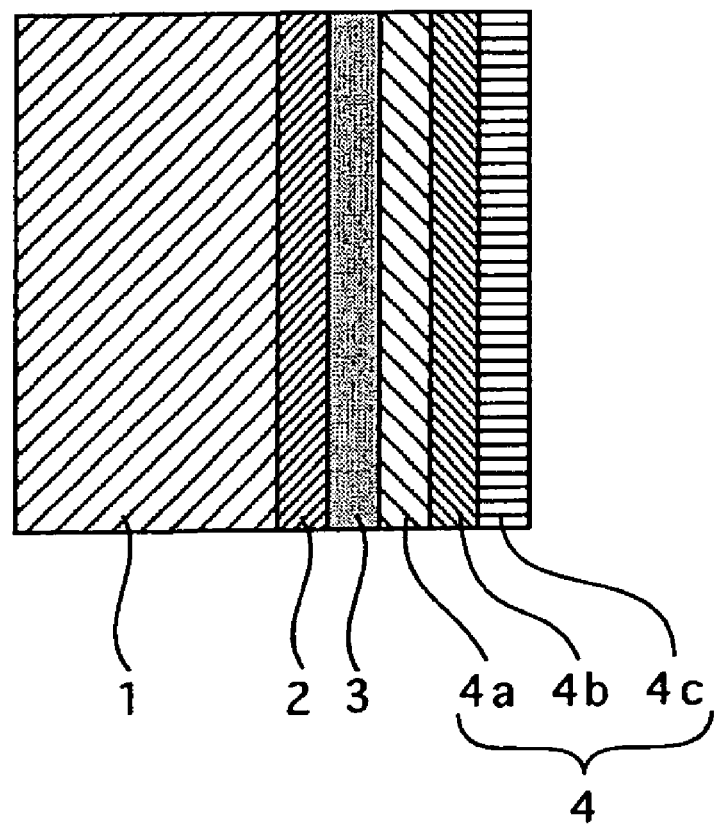
FIG. 4 is a sectional view illustrating a solid electrolytic capacitor fabricated in Comparative Example 2.

In a solid electrolytic capacitor of Comparative Example 2, the same procedure as in Example A3 was used to form the mixed layer 4b containing the silver particles of nearly spherical form having the median diameter of 3 μm and acetylene black having the median diameter of 0.05 μm bound by polyamideimide. Then, as shown in FIG. 4, the silver paste prepared by admixing 88 parts by weight of the silver particles having the median diameter of 3 μm with 5 parts by weight of polyamideimide and 7 parts by weight of γ-butyrolactone as the solvent was coated on the mixed layer 4b and dried at 150° C. for 30 minutes to form the silver layer 4c on the mixed layer 4b.

The resultant solid electrolytic capacitors of Examples A1 to A4, Example B1 and Comparative Examples 1 and 2 were each determined for the equivalent series resistance (ESR) by means of an equivalent series resistance meter at a frequency of 100 kHz. An index number of the equivalent series resistance (ESR) of each of the solid electrolytic capacitors was determined on a basis of the equivalent series resistance (ESR) of the solid electrolytic capacitor of Example A1 defined as 100. The results are listed in Table 1 as below.

TABLE 1

|  | EXAMPLE | | | | | COMPARATIVE EXAMPLE | |
| --- | --- | --- | --- | --- | --- | --- | --- |
|  | A1 | A2 | A3 | A4 | B1 | 1 | 2 |
| ESR | 100 | 100 | 102 | 97 | 102 | 160 | 150 |

As is apparent from the table, each of the solid electrolytic capacitors of Examples A1 to A4 wherein the respective carbon layer 4a and the mixed layer 4b containing the first material consisting of the silver particles having the median diameter of not less than 2 μm and the second material consisting of the conducting carbon particles and/or silver particles having the median diameter of 1 μm or less were formed on the electrolytic layer 3 and the solid electrolytic capacitor of Example B1 wherein the carbon layer 4a was not formed and the mixed layer 4b was formed directly on the electrolytic layer 3 presented a notably decreased ESR as compared with the solid electrolytic capacitor of Comparative Example 1 wherein the silver layer 4c containing the silver particles having the median diameter of 3 μm was formed instead of the mixed layer 4b and the solid electrolytic capacitor of Comparative Example 2 wherein the silver layer 4c containing only the silver particles having the median diameter of 3 μm was formed on the mixed layer 4b.

According to a comparison among the solid electrolytic capacitors of Examples A1 to A4 and Example B1, the solid electrolytic capacitors using the second material containing the silver particles having the median diameter of 1 μm or less presented a decreased ESR as compared with the solid electrolytic capacitor of Example A3 using the second material containing only acetylene black of the conducting carbon particles. In particular, the ESR in the solid electrolytic capacitor of A4 using the second material containing both the silver particles having the median diameter of 1 μm or less and acetylene black of the conducting carbon particles was further decreased.

Examples A5 and A6

The same procedure as in Example A3 was used to fabricate each of solid electrolytic capacitors of Example A5 and A6, except that a type of the conducting carbon particles contained in the mixed layer 4b was changed.

As the conducting carbon particles, graphite having the median diameter of 5 μm was used in Example A5 and a mixture prepared by mixing acetylene black having the median diameter of 0.05 μm and graphite having the median diameter of 5 μm in a weight ratio of 1:1 was used in Example A6.

In the same manner as above, the resultant solid electrolytic capacitors of Examples A5 and A6 were each determined for the equivalent series resistance (ESR) at the frequency of 100 kHz. Then, an index number of the equivalent series resistance (ESR) of each of the solid electrolytic capacitors of Examples A5 and A6 was determined on the basis of the equivalent series resistance (ESR) of the solid electrolytic capacitor of Example A3 defined as 100. The results are listed in Table 2 as below.

TABLE 2

|  | TYPE OF CONDUCTING CARBON PARTICLES | ESR |
| --- | --- | --- |
| EXAMPLE A3 | acetylene black | 100 |
| EXAMPLE A5 | graphite | 105 |
| EXAMPLE A6 | acetylene black + graphite | 97 |

As is apparent from the table, as the solid electrolytic capacitor of Example A3 using acetylene black as the conducting carbon particles contained in the mixed layer 4b, each of the solid electrolytic capacitors of Examples A5 and A6 using graphite or the mixture of acetylene black and graphite presented a notably decreased ESR as compared with the solid electrolytic capacitors of Comparative Examples 1 and 2.

Further, the solid electrolytic capacitors wherein acetylene black having a small particle diameter was contained as the conducting carbon particles in the mixed layer 4b presented a decreased ESR as compared with the solid electrolytic capacitor of Example A5 wherein only graphite having a large particle diameter was contained as the conducting carbon materials in the mixed layer 4b. In particular, the ESR in the solid electrolytic capacitor of Example A6 using the mixture of acetylene black having the small particle diameter and graphite having the large particle diameter was further decreased.

Examples A7 and A8 and Comparative Examples 3 and 4

The same procedure as in Example A1 was used to fabricate each of solid electrolytic capacitors of Examples A7 and A8 and Comparative Examples 3 and 4, except that the median diameter of the $Ag_2O$ particles to be added to the paste for the mixed layer was changed and the median diameter of the silver particles having a small particle diameter to be mixed to the silver particles having the median diameter of 3 μm in the mixed layer 4b was changed.

Example A7 used $Ag_2O$ particles having a median diameter of 0.1 μm, Example A8 used $Ag_2O$ particles having a median diameter of 1.0 μm, Comparative Example 3 used $Ag_2O$ particles having a median diameter of 1.5 μm and Comparative Example 4 used $Ag_2O$ particles having a median diameter of 2.0 μm. When the $Ag_2O$ particles were dried at 160° C. for 30 minutes and reduced into silver particles in the same manner as above, the silver particles having the same median diameter as before reduction were contained in the mixed layer.

In the same manner as above, the resultant solid electrolytic capacitors of Examples A7 and A8 and Comparative Examples 3 and 4 were each determined for the equivalent series resistance (ESR) at the frequency of 100 kHz. Then, an index number of the equivalent series resistance (ESR) of each of the solid electrolytic capacitors of Examples A7 and A8 and Comparative Examples 3 and 4 was determined on the basis of the equivalent series resistance (ESR) of the solid electrolytic capacitor of Example A1 defined as 100. The results are listed in Table 3 as below.

TABLE 3

|  | AVERAGE PARTICLE DIAMETER OF SILVER OXIDE(I) $Ag_2O$ (μm) | ESR |
| --- | --- | --- |
| EXAMPLE A7 | 0.1 | 98 |
| EXAMPLE A1 | 0.5 | 100 |
| EXAMPLE A8 | 1 | 110 |
| COMPARATIVE EXAMPLE 3 | 1.5 | 150 |
| COMPARATIVE EXAMPLE 4 | 2 | 160 |

As is apparent from the table, in each of the solid electrolytic capacitors of Examples A1, A7 and A8 using silver particles having the median diameter of 1 μm or less as the silver particles having the small particle diameter to be mixed with the silver particles having the median diameter of 3 μm in the mixed layer 4b, the ESR was notably decreased as compared with the solid electrolytic capacitors of Comparative Examples 3 and 4 using silver particles having the median diameter of more than 1 μm as the silver particles having the small particle diameter to be mixed with the silver particles having the median diameter of 3 μm.

Examples A9 to A18

In Examples A9 to A18, the same procedure as in Example A4 was used to form the mixed layer 4b containing the mixture of the silver particles having the median diameter of 3 μm, the $Ag_2O$ particles having the median diameter of 0.5 μm and acetylene black having the median diameter of 0.05 μm, except the weight ratio thereof was changed.

Each weight ratio was set in 99.75:0.125:0.125 in Example A9, 99.5:0.25:0.25 in Example A10, 99:0.5:0.5 in Example A11, 98:1:1 in Example A12, 97:1:2 in Example A13, 90:5:5 in Example A14, 80:15:5 in Example A15, 60:35:5 in Example A16, 55:40:5 in Example A17 and 50:45:5 in Example A18. Except for the above, the same procedure as in Example A4 was used to fabricate each of the solid electrolytic capacitors of Example A9 to A18.

In the resultant solid electrolytic capacitors of Examples A9 to A18, a weight ratio W (Wt %) of the second material based on a total amount of the first material consisting of the silver particles having the median diameter of 3 μm and the second material consisting of the silver particles reduced from the $Ag_2O$ particles having the median diameter of 0.5 μm and acetylene black was almost the same as the aforesaid weight ratio in mixing. Each weight ratio W was 0.25 wt % in Example A9, 0.5 wt % in Example A10, 1 wt % in Example A11, 2 wt % in Example A12, 3 wt % in Example A13, 10 wt % in Example A14, 20 wt % in Example A15, 40 wt % in Example A16, 45 wt % in Example A17, 50 wt % in Example A18 and 5 wt % in Example A4.

In the same manner as above, the resultant solid electrolytic capacitors of Examples A9 to A18 were each determined for the equivalent series resistance (ESR) at the frequency of 100 kHz. Then, an index number of the equivalent series resistance (ESR) of each of the solid electrolytic capacitors of Examples A9 to A18 was determined on the basis of the equivalent series resistance (ESR) of the solid electrolytic capacitor of Example A4 defined as 100. The results are listed in Table 4 as below.

TABLE 4

| | WEIGHT RATIO | | | | |
| --- | --- | --- | --- | --- | --- |
| | 3 μm SILVER PARTICLES | 0.5 μm SILVER OXIDE(I) $Ag_2O$ PARTICLES | ACETYLENE BLACK | W (wt %) | ESR |
| EXAMPLE A9 | 99.75 | 0.125 | 0.125 | 0.25 | 145 |
| EXAMPLE A10 | 99.5 | 0.25 | 0.25 | 0.5 | 115 |
| EXAMPLE A11 | 99 | 0.5 | 0.5 | 1 | 105 |
| EXAMPLE A12 | 98 | 1 | 1 | 2 | 105 |
| EXAMPLE A13 | 97 | 1 | 2 | 3 | 100 |
| EXAMPLE A4 | 95 | 2.5 | 2.5 | 5 | 100 |
| EXAMPLE A14 | 90 | 5 | 5 | 10 | 102 |
| EXAMPLE A15 | 80 | 15 | 5 | 20 | 102 |
| EXAMPLE A16 | 60 | 35 | 5 | 40 | 103 |
| EXAMPLE A17 | 55 | 40 | 5 | 45 | 135 |
| EXAMPLE A18 | 50 | 45 | 5 | 50 | 140 |

As is apparent from the table, each of the solid electrolytic capacitors of Examples A4 and A10 to A16 wherein the weight ratio W of the second material based on the total amount of the first material consisting of the silver particles having the median diameter of 3 μm and the second material consisting of the silver particles having the median diameter of 0.5 μm and acetylene black was set in a range of 0.5 to 40 wt % presented a notably decreased ESR as compared with the solid electrolytic capacitor of Example A9 wherein the weight ratio W was 0.25 wt % and the solid electrolytic capacitors of Examples A17 and A18 wherein the weight ratio W was more than 40 wt %. In particular, the ESR in each of the solid electrolytic capacitors of Example A4 and Examples A13 to A16 wherein the weight ratio W was in a range of 3 to 40 wt % was further decreased.

Examples A19, A20 and Comparative Example 5

The same procedure as in Example A1 was used to fabricate each of solid electrolytic capacitors of Examples A19, A20 and Comparative Example 5, except that a drying temperature for drying the paste for the mixed layer was changed. Each drying temperature was set to 170° C. in Example A19, 180° C. in Example A20 and 150° C. in Comparative Example 5. In a case where the drying temperature for drying the paste for the mixed layer was set to 150° C. as in Comparative Example 5, the $Ag_2O$ particles in the paste for the mixed layer were not sufficiently reduced to the silver particles.

In the same manner as above, the resultant solid electrolytic capacitors of Examples A19, A20 and Comparative Example 5 were each determined for the equivalent series resistance (ESR) at the frequency of 100 kHz. Then, an index number of the equivalent series resistance (ESR) of each of the solid electrolytic capacitors of Examples A19, A20 and Comparative Example 5 was determined on the basis of the equivalent series resistance (ESR) of the solid electrolytic capacitor of Example A1 defined as 100. The results are listed in Table 5 as below.

TABLE 5

| | DRYING TEMPERATURE (° C.) | ESR |
|---|---|---|
| COMPARATIVE EXAMPLE 5 | 150 | 150 |
| EXAMPLE A1 | 160 | 100 |
| EXAMPLE A19 | 170 | 100 |
| EXAMPLE A20 | 180 | 100 |

As is apparent from the table, each of the solid electrolytic capacitors of Examples A1, A19 and A20 wherein the drying temperature for drying the paste for the mixed layer was set to not less than 160° C. to reduce the $Ag_2O$ particles sufficiently to the silver particles presented a notably decreased ESR as compared with the solid electrolytic capacitor of Comparative Example 5 wherein the drying temperature was set to 150° C. and the $Ag_2O$ particles in the mixed layer were not sufficiently reduced to silver particles.

Examples A1a, A1b and A1c and Comparative Examples 1a, 1b and 1c

The same procedure as in Example A1 was used to fabricate each of solid electrolytic capacitors of Examples A1a, A1b, and A1c, except that a type of the binding agent for preparing the paste for the mixed layer was changed.

Example A1a used an epoxy resin as the binding agent and diethylene glycol monobutyl ether as the solvent. Example A1b used a polyester resin as the binding agent and cyclohexanone as the solvent. Example A1c used a phenolic resin as the binding agent and propylene glycol as the solvent. Except for the above, the same procedure as in Example A1 was used to fabricate each of the solid electrolytic capacitors of Examples A1a, A1b and A1c.

The same procedure as in Comparative Example 1 was used to fabricate each of solid electrolytic capacitors of Comparative Examples 1a, 1b, and 1c, except that a type of the binding agent for preparing the paste for the mixed layer was changed.

Comparative Example 1a used the epoxy resin as the binding agent and diethylene glycol monobutyl ether as the solvent. Comparative Example 1b used the polyester resin as the binding agent and cyclohexanone as the solvent. Comparative Example 1c used the phenolic resin as the binding agent and propylene glycol as the solvent. Except for the above, the same procedure as in Comparative Example 1 was used to fabricate each of the solid electrolytic capacitors of Comparative Examples 1a, 1b and 1c.

In the same manner as above, the resultant solid electrolytic capacitors of Examples A1a, A1b and A1c and Comparative Examples 1a, 1b and 1c were each determined for the equivalent series resistance (ESR) at the frequency of 100 kHz. Then, an index number of the equivalent series resistance (ESR) of each of the solid electrolytic capacitors of Examples A1a, A1b and A1c and Comparative Examples 1a, 1b and 1c was determined on the basis of the equivalent series resistance (ESR) of the solid electrolytic capacitor of Example A1 defined as 100. The results are listed in Table 6 as below.

TABLE 6

| | TYPE OF BINDING AGENT | ESR |
|---|---|---|
| EXAMPLE A1 | polyamideimide | 100 |
| EXAMPLE A1a | epoxy resin | 105 |
| EXAMPLE A1b | polyester resin | 105 |
| EXAMPLE A1c | phenolic resin | 160 |
| COMPARATIVE EXAMPLE 1 | polyamideimide | 160 |
| COMPARATIVE EXAMPLE 1a | epoxy resin | 165 |
| COMPARATIVE EXAMPLE 1b | polyester resin | 165 |
| COMPARATIVE EXAMPLE 1b | phenolic resin | 200 |

As is apparent from the table, even in a case where the type of the biding agent was changed, each of the solid electrolytic capacitors of Examples A1a, A1b and A1c presented a notably decreased ESR as compared with the solid electrolytic capacitors of Comparative Examples 1a, 1b and 1c.

In a comparison of values of the ESR according to the type of the biding agent, in the case of using polyamideimiede(polyimide resin), epoxy resin or polyester resin, the ESR was notably decreased as compared with the case of using phenolic resin.

Examples C1 to C3

The same procedure as in Example A4 was used to fabricate each of solid electrolytic capacitors of Examples C1 to C3, except that the first material consisting of the silver particles of nearly spherical form having the median diameter of 3 μm and the second material consisting of the silver oxide particles of nearly spherical form having the median diameter of 0.5 μm contained in the mixed layer were changed.

In Example C1, scale-shaped silver particles wherein the median in the maximum length L was 3 μm and the ratio of the maximum length L to the thickness d (L/d) was 20 were used as the first material and scale-shaped silver particles wherein the median in the maximum length was 0.5 µm and the ratio of the maximum length L to the thickness d (L/d) was 20 were used as the second material.

In Example C2, the scale-shaped silver particles wherein the median in the maximum length L was 3 µm and the ratio of the maximum length L to the thickness d (L/d) was 20 were used as the first material and the silver particles of nearly spherical form having the median diameter of 0.5 µm used in Example A4 were used as the second material.

In Example C3, the silver particles of nearly spherical form having the median diameter of 3 µm used in Example A4 were used as the first material and scale-shaped silver particles wherein the median in the maximum length L was 0.5 µm and the ratio of the maximum length L to the thickness d (L/d) was 20 were used as the second material.

In the same manner as above, the resultant solid electrolytic capacitors of Examples C1 to C3 were each determined for the equivalent series resistance (ESR) at the frequency of 100 kHz. Then, an index number of the equivalent series resistance (ESR) of each of the solid electrolytic capacitors of Examples C1 to C3 was determined on the basis of the equivalent series resistance (ESR) of the solid electrolytic capacitor of Example A4 defined as 100. The results are listed in Table 7 as below.

TABLE 7

|  | SILVER PARTICLES OF FIRST MATERIAL | SILVER PARTICLES OF SECOND MATERIAL | ESR |
|---|---|---|---|
| EXAMPLE C1 | scale-shaped | scale-shaped | 65 |
| EXAMPLE C2 | scale-shaped | nearly spherical form | 93 |
| EXAMPLE C3 | nearly spherical form | scale-shaped | 95 |
| EXAMPLE A4 | nearly spherical form | nearly spherical form | 100 |

As is apparent from the table, each of the solid electrolytic capacitors of Examples C1 to C3 using the scale-shaped silver particles at least either in the first material or in the second material presented a notably decreased ESR as compared with the solid electrolytic capacitor of Examples A4 using the silver particles of nearly spherical form in both of the first material and the second material. In particular, the ESR in the solid electrolytic capacitor of Example C1 using the scale-shaped silver particles in both of the first material and the second material was further decreased.

Examples C4 to C7

In Examples C4 to C7, the scale-shaped silver particles wherein the median in the maximum length L was 3 µm were used as the first material and the scale-shaped silver particles wherein the median in the maximum length L was 0.5 µm were used in the same manner as Example C1. However, the ratio of the maximum length L to the thickness d (L/d) in the scale-shaped silver particles of the first material and the second material was changed. Except for the above, the same procedure as in Example C1 was used to fabricate each of solid electrolytic capacitors of Examples C4 to C7.

In Example C4, scale-shaped silver particles wherein the ratio of the maximum length L to the thickness d (L/d) was 4 were used in the first material and the second material. In Example C5, scale-shaped silver particles wherein the ratio of the maximum length L to the thickness d (L/d) was 50 in the first material and the second material were used. In Example C6, scale-shaped silver particles wherein the ratio of the maximum length L to the thickness d (L/d) was 100 were used in the first material and the second material. In Example C7, scale-shaped silver particles wherein the ratio of the maximum length L to the thickness d (L/d) was 120 were used in the first material and the second material.

In the same manner as above, the resultant solid electrolytic capacitors of Examples C4 to C7 were each determined for the equivalent series resistance (ESR) at the frequency of 100 kHz. Then, an index number of the equivalent series resistance (ESR) of each of the solid electrolytic capacitors of Examples C4 to C7 was determined on the basis of the equivalent series resistance (ESR) of the solid electrolytic capacitor of Example A4 defined as 100. The results are listed in Table 8 as below.

TABLE 8

|  | SILVER PARTICLES OF FIRST MATERIAL | | SILVER PARTICLES OF SECOND MATERIAL | | |
|---|---|---|---|---|---|
|  | SHAPE | L/d | SHAPE | L/d | ESR |
| EXAMPLE C4 | scale-shaped | 4 | scale-shaped | 4 | 70 |
| EXAMPLE C1 | scale-shaped | 20 | scale-shaped | 20 | 65 |
| EXAMPLE C5 | scale-shaped | 50 | scale-shaped | 50 | 72 |
| EXAMPLE C6 | scale-shaped | 100 | scale-shaped | 100 | 74 |
| EXAMPLE C7 | scale-shaped | 120 | scale-shaped | 120 | 92 |
| EXAMPLE A4 | nearly spherical form | about 1 | nearly spherical form | about 1 | 100 |

As is apparent from the table, each of the solid electrolytic capacitors of Examples C1 and C4 to C6 using the scale-shaped silver particles wherein the ratio of the maximum length L to the thickness d (L/d) in the first material and the second material was in the range of 4 to 100 presented a notably decreased ESR.

INDUSTRIAL APPLICABILITY

According to the solid electrolytic capacitor of the invention as described above, the mixed layer containing the first material consisting of the silver particles having the median diameter of not less than 2 µm, the second material consisting of the conducting carbon particles and/or the silver particles having the median diameter of 1 µm or less and the biding agent is formed as the cathode on the electrolytic layer, so that the particles of the second material consisting of the conducting carbon particles and/or the silver particles having the median diameter of 1 µm or less enter the spaces between the particles of the first material consisting of the silver particles having the median diameter of not less than 2 µm in the mixed layer. As a result, the conductivity in the mixed layer is improved, the adhering property between the mixed layer and the electrolytic layer is enhanced decreasing the contact resistance thereof, and the equivalent series resistance in the high frequency regions is notably decreased.

Further, in the solid electrolytic capacitor, in a case where the carbon layer is formed between the electrolytic layer and the mixed layer, the adhering property between the mixed layer and the carbon layer is enhanced decreasing the contact resistance thereof, and the equivalent series resistance in the high frequency regions is further decreased.

Furthermore, in the solid electrolytic capacitor, the scale-shaped silver particles of which thickness to the length is very small are used in the first material and the second material in the mixed layer, so that the contact area between the silver particles of the first material and the silver particles of the second material is enlarged, resulting in still further decrease in the equivalent series resistance in the high frequency regions.

What is claimed is:

1. A solid electrolytic capacitor comprising an anode formed of at least one metal selected from tantalum, niobium, titanium and tungsten, and a dielectric layer, an electrolytic layer and a cathode disposed on the anode, wherein the cathode comprises a mixed layer containing a first material consisting of silver particles having an average particle diameter (median diameter) of not less than 2 μm, a second material consisting of conducting carbon particles and/or silver particles having an average particle diameter (median diameter) of 1 μm or less and a binding agent, wherein an amount of the second material based on a total amount of the first material and the second material is in a range of 0.5 to 40 wt %.

2. The solid electrolytic capacitor as claimed in claim 1, wherein the cathode comprises a carbon layer formed between the electrolytic layer and the mixed layer.

3. The solid electrolytic capacitor as claimed in claim 1, wherein the amount of the second material based on the total amount of the first material and the second material is set in a range of 3 to 40 wt %.

4. The solid electrolytic capacitor as claimed in claim 1, wherein the silver particles having the average particle diameter (median diameter) of 1 μm or less are present in said second material and are reduced from silver oxide particles having the average particle diameter (median diameter) of 1 μm or less.

5. The solid electrolytic capacitor as claimed in claim 1, wherein the binding agent is at least one resin selected from polyimide resin, epoxy resin and polyester resin.

6. The solid electrolytic capacitor as claimed in claim 1, wherein the conducting carbon particles are present in said second material and are carbon black and/or graphite.

7. A fabrication method for solid electrolytic capacitor of claim 1 comprising a step of forming the mixed layer containing the silver particles having the average particle diameter (median diameter) of 1 μm or less wherein silver oxide particles having the average particle diameter (median diameter) of 1 μm or less contained in the mixed layer are reduced.

8. The fabrication method for solid electrolytic capacitor as claimed in claim 7, wherein the silver oxide particles are reduced by heat-treatment at not less than 160° C.

9. A solid electrolytic capacitor comprising an anode formed of at least one metal selected from tantalum, niobium, titanium and tungsten, and a dielectric layer, an electrolytic layer and a cathode disposed on the anode, wherein the cathode comprises a mixed layer containing a first material consisting of scale-shaped silver particles having a median in a maximum length of not less than 2 μm and having a ratio of a maximum length L to a thickness d (L/d) in a range of 4 to 100 and a second material consisting of conducting carbon particles and/or silver particles having an average particle diameter (median diameter) of 1 μm or less and a binding agent.

10. The solid electrolytic capacitor as claimed in claim 9, wherein the cathode comprises a carbon layer formed between the electrolytic layer and the mixed layer.

11. The solid electrolytic capacitor as claimed in claim 9, wherein an amount of the second material based on a total amount of the first material and the second material is set in a range of 0.5 to 40 wt %.

12. The solid electrolytic capacitor as claimed in claim 11, wherein the amount of the second material based on the total amount of the first material and the second material is set in a range of 3 to 40 wt %.

13. A solid electrolytic capacitor comprising an anode formed of at least one metal selected from tantalum, niobium, titanium and tungsten, and a dielectric layer, an electrolytic layer and a cathode disposed on the anode, wherein the cathode comprises a mixed layer containing a first material consisting of silver particles having an average particle diameter (median diameter) of not less than 2 μm, a second material consisting of conducting carbon particles and/or scale-shaped silver particles having a median in a maximum length of 1 μm or less and having a ratio of a maximum length L to a thickness d (L/d) in a range of 4 to 100 and a binding agent.

14. The solid electrolytic capacitor as claimed in claim 13, wherein the cathode comprises a carbon layer formed between the electrolytic layer and the mixed layer.

15. The solid electrolytic capacitor as claimed in claim 13, wherein an amount of the second material based on a total amount of the first material and the second material is set in a range of 0.5 to 40 wt %.

16. The solid electrolytic capacitor as claimed in claim 15, wherein the amount of the second material based on the total amount of the first material and the second material is set in a range of 3 to 40 wt %.

17. A solid electrolytic capacitor comprising an anode formed of at least one metal selected from tantalum, niobium, titanium and tungsten, and a dielectric layer, an electrolytic layer and a cathode disposed on the anode, wherein the cathode comprises a mixed layer containing a first material consisting of scale-shaped silver particles having a median in a maximum length of not less than 2 μm, a second material consisting of conducting carbon particles and/or scale-shaped silver particles having a median in a maximum length of 1 μm or less and a binding agent, wherein a ratio of a maximum length L to a thickness d (L/d) of the scale-shaped silver particles is in a range of 4 to 100.

18. The solid electrolytic capacitor as claimed in claim 17, wherein the cathode comprises a carbon layer formed between the electrolytic layer and the mixed layer.

19. The solid electrolytic capacitor as claimed in claim 17, wherein an amount of the second material based on a total amount of the first material and the second material is set in a range of 0.5 to 40 wt %.

20. The solid electrolytic capacitor as claimed in claim 19, wherein the amount of the second material based on the total amount of the first material and the second material is set in a range of 3 to 40 wt %.

* * * * *